June 17, 1924.  G. H. NOBBS  1,497,695
TRACTOR
Filed Nov. 28, 1919
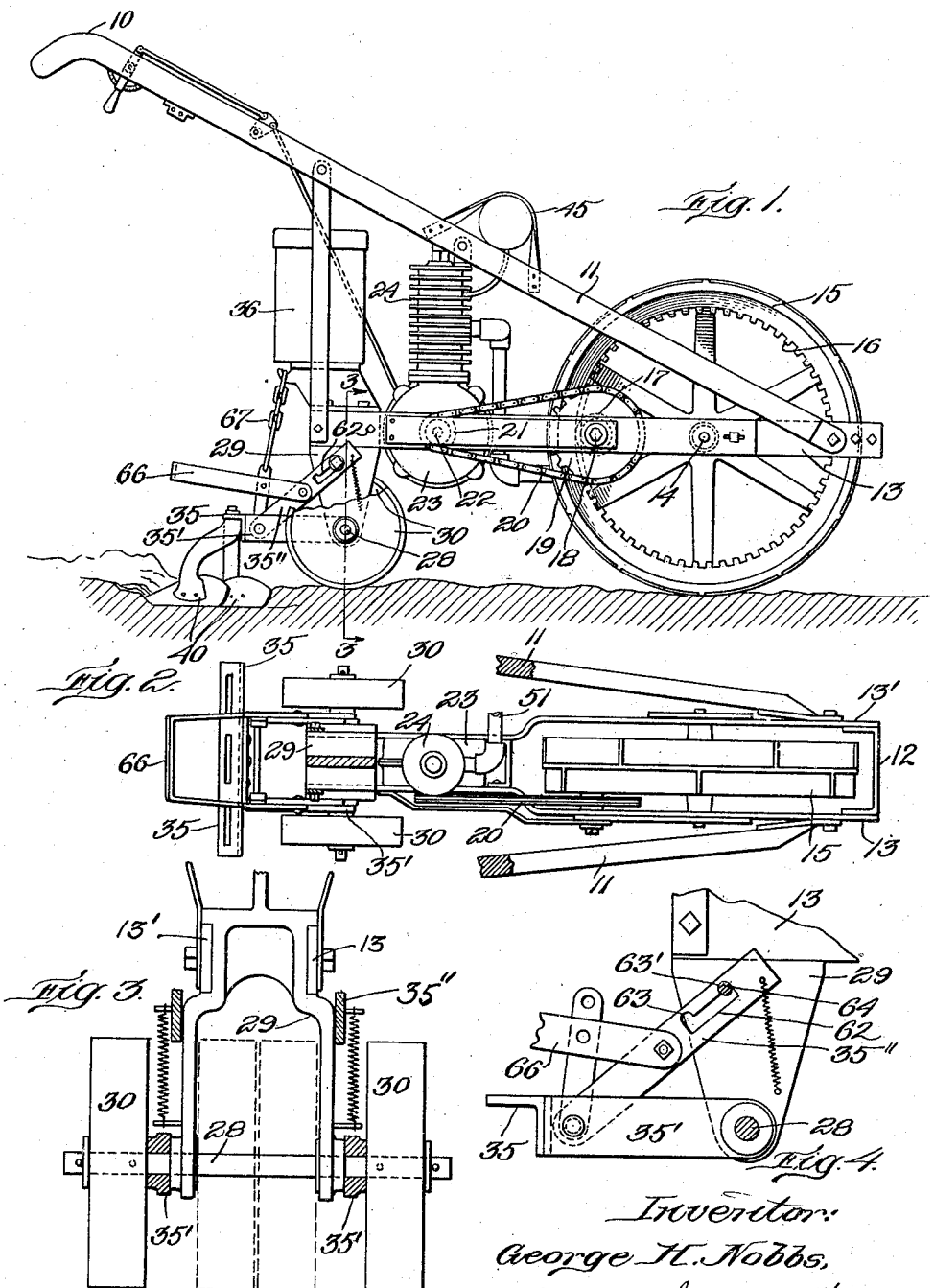
Inventor:
George H. Nobbs.
by Mitchell, Chadwick & Kent
attys.

Patented June 17, 1924.

1,497,695

UNITED STATES PATENT OFFICE.

GEORGE H. NOBBS, OF WATERTOWN, MASSACHUSETTS.

TRACTOR.

Application filed November 28, 1919. Serial No. 341,044.

*To all whom it may concern:*

Be it known that I, GEORGE H. NOBBS, a citizen of the United States, residing at Watertown, in the county of Middlesex and State of Massachusetts, have invented certain new and useful Improvements in Tractors, of which the following is a specification.

This invention relates to improvements in tractors. More particularly it relates to tractors of the type in which a single traction wheel is associated with a frame having a rear support on the ground and rear handles spreading upward and backward, by which a man walking behind guides and controls the apparatus. Such a tractor may be used for various purposes; and the present invention is particularly applicable when it is used as a garden tractor for drawing a tool, as, for example, a cultivator, in the earth between two rows of growing crops. The invention relates particularly to the rear wheel support and to the tool attachment, the especial advantages resulting from the use of the invention being an improvement in ease of guiding and in the automatic maintenance of the tool at the required depth in the earth. A tractor of this general style is shown and claimed broadly in my co-pending application for patent Serial No. 319,379. The present invention is an improvement over the construction illustrated therein in that the rear wheel support is divided into two parts, each part a wheel and both on the same axis, which parts either may be set in the same space previously occupied by the one undivided wheel, or may be spread a little apart, so that, although actually so close together as to operate much as if they constituted a single wheel having a broad face arranged in tandem with the traction wheel, yet they do not in fact run in the track of the traction wheel, but just to each side of it, and yet run within the breadth of surface on which the tool that is being drawn operates. The axle of the rear wheel support of such a tractor is conveniently held by a yoke depending from the frame; and the novel feature introduced by the invention is effected by making that support in two wheels each of half the width of the former single wheel, and then mounting those wheels inside of the yoke in place of the one former wheel, but free to rotate independently of each other; or using an axle that extends to the outside of the yoke and mounting the wheels there, on the outside instead of in between the arms of the yoke. This yoke may also draw a traction bar, and in that case the wheels, when in the outside position, would still be within the limits of breadth of the apparatus as fixed by the transverse spread of handles or by the tool or tools associated therewith. The effect of wheel elements thus spread is a tendency to maintain the apparatus more uniformly in a vertical plane, when in operation, assuming the ground to be horizontal; and the tool is maintained automatically at a uniform depth below the surface by the provision of a notch which latches the tool down. When the yoke is thus latched down, any obstacle such as a loose stone, encountered in the earth by the tool, must yield unless it is able to lift the whole rear part of the frame of the tractor. The equilibrium, with respect to the vertical plane, thus maintained by the spread parts of what is practically a tandem rear wheel, due to their avoiding the softened track of the traction wheel, and the stability of level, with respect to the horizontal plane, maintained by the tool locking latch, are, in the result, found to be combined with and supplemented by an observable ease of lateral guiding and strength of resistance to deflection from the course which the operator is steering which appears to be due to the differential operation of the rear wheel support and to what may be termed the parallax or slight advantage of leverage which the operator's handles acquire from the spread arrangement of rear wheel parts, each part of which is a potential fulcrum, for leverage to resist any deflecting force acting on the forward traction wheel, or indeed, acting on any part of the apparatus. The invention may be applied in various ways other than the specific embodiment which is illustrated; and it is intended that the patent shall cover, by suitable expression in the appended claims, whatever features of patentable novelty exist in the invention disclosed.

In the accompanying drawings:

Figure 1 is a side elevation of apparatus embodying the invention;

Figure 2 is a plan of the same, with upper parts broken away;

Figure 3 is a rear elevation, showing a detail, in the section on line 3—3 of Figure 1, enlarged, and;

Figure 4 is a side elevation of some of the same details and on the same scale, as in Figure 3.

The drawings show a tractor frame having rear handles 10 arranged with a spread and elevation as in a plow or other garden implement, from which handles the fore and aft bars 11 of the frame converge forward and downward to the head, where they join the forward ends of horizontal fore and aft side bars 13, 13'. These are kept at a fixed distance apart by the head bar 12, and support the axle 14 on which the single traction wheel 15 between them is mounted. The latter is driven by a pinion 17, which is journaled on a stud 18 on the side bar 13, and is in mesh with and drives the internal rack gear 16 of the traction wheel 15. Fast with the pinion 17 is a sprocket wheel 19, driven by a chain 20 from a small sprocket wheel 21 on the shaft 22 of a motor, which is illustrated as being a gasoline engine whose crank case 23, cylinder 24, ignition battery box 36, exhaust 51, gasoline supply 45, and other parts are indicated in the drawing. Aft of the traction wheel there is a wheel support 30 carried on an axle 28 passing through the arms of a yoke 29 which depends from the rear of the side bars 13, 13'. A traction bar 35, adjustable in elevation, is held by a yoke 35', which reaches aft from the same axle 28, the yoke swinging up or down on the axle as a pivot, to raise or lower the tool 40. The depth of descent may be limited by a chain 67, which can be fastened at varying lengths, or by the upper terminus of a slot 62 in a side tie bar 35'', through which passes a pin 64 which is rigid with respect to the yoke 29 and frame. The parts thus described may be constructed and arranged as in my said application for patent, or in any other suitable way.

The present invention is concerned especially with the ground support of the frame and with the relation of the traction bar to the frame and to the ground. In Figure 4, where the slot 62 and pin 64 are visible, it is clear that no upward thrust lengthwise of the tie bar 35'' can move that bar with respect to the frame because prevented by the engagement of the pin 64 in the notch 63' which is formed in the upper side of the slot 62. This constitutes a latch, both by action of gravity and by spring 35''', which holds the engagement. In consequence, any force tending to lift the traction bar 35, such as an obstacle which the tool 40 may encounter while moving forward in the ground, is transmitted through side tie bar 35'', pin 64 and yoke 29 to the frame and can produce no motion except by lifting the whole of the apparatus to the rear of the axle of the traction wheel. Yet the tool can be arranged to swing up, automatically, as it may be set at a less depth by hooking e chain 67 higher. If it be desired to provide for locking it at a less depth, additional notches 63' might be provided along the length of the slot 62. Whenever the tool is locked down by pin 64 and notch 63' the operator can raise it by depressing the lever 66 with his foot, thus swinging the side tie bar 35'' in the direction which is transverse of the slot, unlatching the pin 64, and by then depressing the handles 10 until the pin 64 reaches the lower end of the slot 62 where, pressure on the lever 66 being now released, the pin will engage in the notch 63 so that upon the operator letting the handles up again the draw bar and tool will rise with them. The notch 63 is preferably so fixed that the tool will thus be held above the level of the ground when the traction wheel is on the ground.

A broad tool thus locked down in the ground is held more evenly in the ground with the aid of another feature of the invention, which consists in dividing the rear wheel support 30 into two parts. These may preferably be two wheels occupying the positions shown in full lines in Figure 3 where they are spread enough to avoid yet to run close beside the track of softened earth made by the traction wheel 15. The slight spread thus indicated prevents the operator making a casual inclination of the tractor to one side or the other, which would drive one or the other edge of the tool in deeper, in case the engagement of pin 64 in notch 63' were preventing the tool from rising. A spread of the degree suggested by the full lines in Figure 3 both produces the effect of a more stability, which is useful in a hand guided tractor, and preserves the advantages of a tandem wheel tractor therefor, and avoids the evil of apparatus which straddles a row of growing crops. It preserves the tandem effect because the slightly spread wheels 30 are still well within the spread of the handles 10. This is clear from Figure 2, where although the bars 11 of the frame leading to the handles are cut away it can be seen that they are wider than the wheels 30 where they are cut, and must be wider still at the rear at the handles 10, so that mere pressure downward by the operator on either handle will tend to tip the tractor to one side. It is found that the added stability is an advantage when the operator has occasion to turn his attention and perhaps to turn his body, so that the tandem machine's limited stability is momentarily not supplemented by the operator's own natural sense of equilibrium. Moreover, the machine thus made is more easily handled, and is steered with less effort. This latter is possibly because of the differential turning of the wheels, and because of the improvement in the leverage, favoring the pushing hand, when the operator pushes with either hand in order to turn a little; and probably the firmer footing of the wheel on which the turning is made also contributes. If one wheel hits a stone the disturbance to the whole machine, and to the tool, is less, and the alignment of the machine is preserved more easily.

The division of the rear wheel support is, moreover, of advantage even though the divided parts be not spread, and I prefer to make them of such dimension that they can be set either within or without the yoke 29 which supports the frame. If within, they occupy the position indicated in dotted lines in Figure 3; and it has been observed that when so arranged they clean each other, thus doing away with the need of a scraper, because the parts do not rotate exactly together. As an illustrative example it may be mentioned that, having found it useful before this invention was developed to make a wheel having a face 3¼″ wide, I find that the stated advantageous results of the invention are attained by putting in place of that single wheel two wheels of about 1⅝″ face each. When spread, these may occupy a total width overall of 10″. The wheels and their axle are thus within the width of a 12″ tool traction bar; and are well within the spread of the operator's handles 10, which may conveniently be 17″ or 18″. Thus constructed, the tractor tends with all its weight to hold its tool at the predetermined depth below the surface of the ground, has firm and broad footing to prevent the tool from descending lower, and has in high degree the somewhat opposite qualities of stability for general running, or for standing, and of easy tipping for ready manipulation when at work. The spread of the yoke 29, moreover, is so slight, that when the tool in the ground strikes an obstruction on either side, so that there is upward pressure through the latch notch 63′, that pressure is so nearly under the median line of the frame that practically the full effect of that part of the weight of the motor which is carried on the rear wheel support is applied toward keeping the tool down. If the yoke 29 had a wider spread than just enough to embrace the combined rear wheels arranged together in the dotted line position; or if the two rear wheels were spread from their position, which is so close together even in the full line position, there would be a tendency to lift the machine by tipping it sideways in case of an obstruction hitting the side edge of the tool, lifting it, in so doing, about the other wheel as a fulcrum, and lifting only about half of the weight which is to be lifted when the wheels are so near together that practically they must rise together if either rises.

I claim as my invention:—

1. An attachment for agricultural apparatus having a support running on the ground and a frame mounted thereon with a handle adapted for a walking operator; said attachment comprising a draw bar at the rear part of the apparatus adapted for connection with a ground tool and adapted forward thereof for pivotal connection with the frame, whereby the tool may be raised or lowered; and a link extending from a swinging part of the draw bar to the frame and having a latch at one end which may be engaged when the tool is down, thereby applying the weight of the frame and its apparatus releasably to maintaining the tool in ground engaging position; the draw-bar being mounted in such relation to the handles as to be freely movable to different angles with the handles when the said latch is not engaged.

2. An attachment for agricultural apparatus having a support running on the ground and a frame mounted thereon with a handle adapted for a walking operator; said attachment comprising a draw bar at the rear part of the apparatus adapted for connection with a ground tool and adapted forward thereof for pivotal connection with the frame, whereby the tool may be raised or lowered; and a link attached to a swinging part of the drawbar and extending thence forward and upward to the frame, and attached thereto, one of said attachments being a releasable latch, whereby the weight of the frame and its apparatus is applied releasably toward maintaining the tool in ground engaging position.

3. An attachment for motor driven agricultural apparatus adapted for control by a walking operator and having a support running on the ground with a frame mounted thereon; said attachment comprising a draw bar at the rear part of the apparatus adapted for connection with a ground tool and adapted forward thereof for pivotal connection with the frame, whereby the tool may be raised or lowered; and a link extending from a swinging part of the draw bar to a part of the frame close to the motor, said motor being arranged with respect to the frame and said support so that a considerable part of the weight of the motor is normally borne on said support, and said link having a latch at one end which may be engaged when the tool is down, thereby applying the weight imposed on said support to maintaining the tool in ground engaging position.

4. An attachment for agricultural apparatus having a frame with forward and rear supports therefor running on the ground, one of them being a traction wheel, and having a handle behind the rear support adapted for a walking operator; said attachment comprising a draw bar at the rear part of the apparatus adapted for connection with a ground tool and adapted forward thereof for pivotal connection with the frame; a link extending from a swinging part of the draw bar to the frame and having a latch engagement when the tool is down, whereby pressure on the frame is transmitted to the draw bar to maintain the tool in ground engaging position; and releasing means for releasing said latch to permit relative swinging of the frame and draw bar about the rear support thereby enabling the operator to depress the handle without changing the ground engaging position of the tool.

5. An attachment for agricultural apparatus having a frame with a considerable part of the weight of the apparatus disposed between forward and rear supports running on the ground, and having a handle behind the rear support rigid with the frame and adapted for a walking operator; said attachment comprising a draw bar at the rear part of the apparatus adapted for connection with a ground tool and adapted forward thereof for pivotal connection with the frame; a link extending from a swinging part of the draw bar to the frame and having a latch engagement when the tool is down, whereby pressures on both the handle and the frame are transmitted to the draw bar to maintain the tool in ground engaging position; releasing means for said latch, to permit the frame to be swung about the rear support toward the tool by downward pressure on the handle; and means for latching the draw bar, link and frame together while the latter is swung toward the tool, whereby without aid of the handles the weight forward of the rear support may swing the tool up from its ground engaging position.

6. An attachment for agricultural apparatus having a frame with forward and rear supports running on the ground and a rear operating handle for a walking operator said attachment comprising a draw bar for a ground tool at the rear support, secured movably to the frame, so that its elevation relative thereto may vary, and adapted to be secured fixedly to the tool; and means comprising a pin and slot connection, with notch in the slot, in which notch the pin may engage for latching the draw bar down.

7. An attachment for agricultural apparatus having; in combination, a frame with forward and rear supports arranged in tandem, comprising a draw bar to which a ground tool may be fast, pivoted at the rear support and projecting to the rear, and a link rising obliquely from the extremity of the projection, adapted to slide in engagement with the frame at said support and having a latch engagement therewith when in low position, thereby constituting a strut whereby the pressure imposed on said support may hold down said draw bar and tool in the ground.

8. An attachment for motor driven agricultural apparatus adapted for control by a walking operator and having a frame with a single traction wheel support forward and with a divided-wheel support at the rear constituting a fulcrum whereon the frame may be swung, the whole being arranged with the weight of the motor carried on the frame between said supports; said attachment comprising a draw bar at the rear of the apparatus adapted for rigid connection with a ground tool and having a yoke forward thereof for pivotal connection with the axle of the divided-wheel support, the arms of said yoke being far enough apart to fit outside the wheels when the latter are relatively close together and yet close enough to fit inside said wheels when the latter are spread relatively far apart; a link extending forward and upward from the rear of the draw bar to the frame above the divided-wheel support and having a releasable connection therewith, said connection comprising a latch whereby when engaged the link and draw bar are held rigid with respect to the frame to maintain the tool in ground engaging position, and whereby when released the frame may be swung about the said fulcrum to change the elevation of the tool with respect thereto.

Signed at Boston, Massachusetts, this 15th day of November, 1919.

GEORGE H. NOBBS.